United States Patent [19]

Nishihata et al.

[11] Patent Number: 5,380,819
[45] Date of Patent: Jan. 10, 1995

[54] RESIN COMPOSITION INCLUDING POLY(ARYLENE THIOETHER) AND POLYAMIDE

[75] Inventors: Naomitsu Nishihata; Yukio Ichikawa; Takayuki Katto, all of Iwaki, Japan

[73] Assignee: Kureha Kagaku Kogyo K.K., Tokyo, Japan

[21] Appl. No.: 34,453

[22] Filed: Mar. 19, 1993

[30] Foreign Application Priority Data

Mar. 27, 1992 [JP] Japan .................. 4-101640

[51] Int. Cl.⁶ .................. C08G 75/02; C08G 69/48; C08L 81/02
[52] U.S. Cl. .................. 528/336; 525/420; 525/537
[58] Field of Search .................. 525/420, 537; 528/336

[56] References Cited

U.S. PATENT DOCUMENTS

| | | | |
|---|---|---|---|
| 4,645,826 | 2/1987 | Iizuka | 528/388 |
| 4,868,240 | 9/1989 | Ichikawa et al. | 525/420 |

FOREIGN PATENT DOCUMENTS

| | | |
|---|---|---|
| 0166368A2 | 1/1986 | European Pat. Off. |
| 0394933A3 | 10/1990 | European Pat. Off. |
| 0394933A2 | 10/1990 | European Pat. Off. |
| 0414055A1 | 2/1991 | European Pat. Off. |
| 0492246A2 | 7/1992 | European Pat. Off. |
| 0494518A2 | 7/1992 | European Pat. Off. |
| 0495547A2 | 7/1992 | European Pat. Off. |
| 59-1422 | 1/1984 | Japan |
| 2-283763 | 11/1990 | Japan |
| 3-231968 | 10/1991 | Japan |
| 5-51532 | 3/1993 | Japan |

OTHER PUBLICATIONS

L. Freund "Telechilic Poly(thio-1, 4-phenylene)s and Poly(thio-1, 4-phenylene)-Block-Polyamides", Makromol Chem. 191, Jun. 1990, pp. 815–828.

*Primary Examiner*—John Kight, III
*Assistant Examiner*—P. Hampton-Hightower
*Attorney, Agent, or Firm*—Lowe, Price, LeBlanc & Becker

[57] ABSTRACT

A resin composition includes a poly(arylene thioether) and a polyamide. At least part of the poly(arylene thioether) consists of a poly(arylene thioether) containing phthalic anhydride groups.

5 Claims, 2 Drawing Sheets

RESIN COMPOSITION INCLUDING POLY(ARYLENE THIOETHER) AND POLYAMIDE

FIELD OF THE INVENTION

The present invention relates to resin compositions including a poly(arylene thioether) and a polyamide.

BACKGROUND OF THE INVENTION

Poly(arylene thioethers) (hereinafter abbreviated as "PATEs") represented by poly(phenylene sulfide) (hereinafter abbreviated as "PPS") are polymers having predominant recurring units of arylene thioether represented by the formula, —Ar—S— wherein —Ar— means an arylene group, and are used in a wide variety of application fields because they are excellent in heat resistance, flame retardance, chemical resistance, mechanical properties and the like.

Since PPS is generally poor in impact strength, it has been proposed to blend a polyamide with PPS into a resin composition improved in impact resistance (Japanese Patent Publication No. 1422/1984). However, PPS is insufficient in compatibility with the polyamide, so that the mere blending of PPS with the polyamide results in a molded or formed product poor in surface profile and also insufficient in effect to improve mechanical properties.

In Macromol. Chem., Vol. 191, 815–828 (1990), there is disclosed a process for the production of a block copolymer containing PPS blocks and polyamide blocks, in which a polyamide is polymerized in the presence of a telechelic PPS containing functional groups such as carboxyl group on its both terminals. According to this process, a polymer having good mechanical properties may possibly be obtained. The process however involves a drawback that its operation, treatment and the like are complicated.

Japanese Patent Application Laid-Open No. 231968/1991 discloses a resin composition composed of a carboxyl-containing PPS, a hydrogenated styrene-butadiene block copolymer and a polyamide. The invention described in this publication intends to introduce carboxyl groups into PPS to give PPS reactivity to an amino group on the terminal of the polyamide, thereby solving the problem that PPS is insufficient in compatibility with the polyamide. According to this publication, as the carboxyl-containing PPS, there is used a polymer obtained by upon the reaction of an alkali metal sulfide with a dihalobenzene in an organic amide to produce a PPS, causing a carboxyl-containing aromatic halide such as 2,4-dichlorobenzoic acid or p-chlorobenzoic acid to coexist in the reaction system.

However, such a carboxyl-containing PPS tends to undergo decarboxylation upon its melt blending, or molding or forming and processing at an elevated temperature, whereby its carboxyl groups are decomposed. As a result, it is considered that the effect of the functional groups introduced into the polymer is impaired. In addition, The conventionally-known process for the production of the carboxyl-containing PPS can provide a polymer only in the form of powder and hence involves a problem that the handling properties of the polymer are deteriorated.

Japanese Patent Application Laid-Open No. 283763/1990 discloses a resin composition obtained by mixing and kneading a modified PPS, which has been obtained by reacting a carboxylic anhydride to a poly(phenylene sulfide) resin prepared by the conventionally-known process, and a thermoplastic resin such as a polyamide resin. More specifically, this modification reaction is carried out by a process wherein PPS powder is dry-blended with the carboxylic anhydride, and the resultant blend is then melted and kneaded in an extruder controlled at 290°–310° C. and then extruded through the extruder into pellets. In the modified PPS obtained by this process, however, sufficiently strong chemical bonding does not occur between the carboxylic anhydride and PPS. Therefore, the resin composition composed of the modified PPS and polyamide is also hard to acquire satisfactory mechanical properties.

On the other hand, the present assignee previously filed a patent application as to a process for the production of a granular PATE containing carboxyl groups, in which an alkali metal sulfide, a dihalogenated aromatic compound and a dihalogenated aromatic carboxylic acid are subjected to a polymerization reaction in the presence of an alkaline earth metal compound in a polar solvent containing water (EP 494518; CA 2,056,332). In addition, a patent application as to a blend of the carboxyl-containing PATE and a polyamide was also filed (Japanese Patent Application Laid-Open No. 51532/1993). The introduction of carboxyl groups into PATE makes it possible to improve the compatibility of PATE with polyamide. Such a polymer however involves a drawback that the carboxyl groups introduced therein are insufficient in heat stability, and the resulting blend may hence be hard in some cases to acquire good mechanical properties under thermally severe processing conditions.

OBJECTS AND SUMMARY OF THE INVENTION

It is an object of this invention to provide a resin composition composed of a poly(arylene sulfide) and a polyamide, which can acquire good mechanical properties even under thermally severe processing conditions.

The present inventors have carried out an extensive investigation with a view toward overcoming the above-described problems involved in the prior art. As a result, it has been found that when upon providing a blend of a PATE and a polyamide, a PATE containing phthalic anhydride groups is used as the whole or a part of the PATE component, a resin composition in which the individual components are excellent in compatibility with each other and which is good in mechanical properties can be obtained.

The PATE containing phthalic anhydride groups can easily be obtained by upon the polymerization reaction of an alkali metal sulfide with a dihalogen-substituted aromatic compound to produce a PATE, causing a monohalogen-substituted phthalic compound to exist in a polymerization reaction system, and using specific reaction conditions. Alternatively, such a polymer may also be obtained by causing an alkali metal sulfide to act on a PATE to depolymerize the PATE and then reacting a monohalogen-substituted phthalic compound with the depolymerization product.

The PATE containing a phthalic anhydride group on at least one terminal thereof is excellent in compatibility with polyamide, does not undergo a decomposition reaction such as decarboxylation even at a temperature not lower than the melting temperature of PATE, and is superb in heat stability.

The present invention has been led to completion on the basis of these findings.

According to the present invention, there is thus provided a resin composition comprising a poly(arylene thioether) and a polyamide, at least part of said poly(arylene thioether) consisting of a poly(arylene thioether) containing phthalic anhydride groups.

DETAILED DESCRIPTION OF THE INVENTION

Features of the present invention will hereinafter be described in detail.

PATE

The PATE useful in the practice of this invention is a polymer having predominant recurring units of arylene thioether represented by the formula, —Ar—S— wherein —Ar— means an arylene group. If —Ar—S— is defined as 1 mole (basal mole), the PATE used in this invention is a polymer containing this recurring unit in a proportion of generally at least 50 mole %, preferably at least 70 mole %, more preferably at least 90 mole %.

Such a PATE can be obtained in accordance with any known process in which an alkali metal sulfide and a dihalogen-substituted aromatic compound are subjected to a polymerization reaction in a polar organic solvent [for example, U.S. Pat. No.4,645,826 (EP 166368)].

As the polar organic solvent, an aprotic polar solvent stable to alkali at a high temperature is used. As specific examples thereof, may be mentioned amide compounds such as N,N-dimethylformamide and N,N-dimethylacetamide; N-alkyl- or N-cycloalkyllactams such as N-methyl-ε-caprolactam, N-methylpyrrolidone and N-cyclohexylpyrrolidone; N,N-dialkylimidazolidinone compounds such as 1,3-dimethyl-2-imidazolidinone; tetraalkylureas such as tetramethylurea; hexaalkylphosphoric triamides such as hexamethylphosphoric triamide; and mixtures of at least two compounds thereof.

As examples of the alkali metal sulfide, may be mentioned lithium sulfide, sodium sulfide, potassium sulfide, rubidium sulfide and cesium sulfide. These alkali metal sulfides can be used in anhydrous forms, or as hydrates or aqueous mixtures. In addition, an alkali metal sulfide prepared in situ from an alkali hydrosulfide may also be used. These alkali metal sulfides may be used either singly or in any combination thereof.

As examples of the dihalogen-substituted aromatic compound, may be mentioned dihalogen-substituted benzenes such as p-dihalobenzenes and m-dihalobenzenes; dihalogen-substituted alkylbenzenes such as 2,3-dihalotoluenes, 2,4-dihalotoluenes, 2,6-dihalotoluenes, 3,4-dihalotoluenes and 2,5-dihalo-p-xylenes; dihalogen-substituted arylbenzens such as 2,5-dihalodiphenyls; dihalogen-substituted biphenyls such as 4,4'-dihalobiphenyls; dihalogen-substituted naphthalenes such as 2,6-dihalonaphthalenes and 1,5-dihalonaphthalenes; and the like. Halogen elements in these dihalogen-substituted aromatic compounds may be fluorine, chlorine, bromine or iodine and may be identical or different from each other.

Among the above-mentioned dihalogen-substituted aromatic compounds, dihalogen-substituted benzenes are preferred with p-dichlorobenzene being particularly preferred. These dihalogen-substituted aromatic compounds may be used either singly or in any combination thereof. A trihalogen-substituted benzene, dihalogen-substituted aniline or the like may also be used in combination as a minor component for the modification of molecular weight of the resulting polymer and the like, as needed.

The PATE useful in the practice of this invention is a polymer having a melt viscosity of generally 100–7000 poises, preferably 200–6000 poises, more preferably 300–5000 poises as measured at 310° C. and a shear rate of 1200 sec$^{-1}$.

PATE containing phthalic anhydride groups

The phthalic anhydride group-containing PATE used in this invention is required that the phthalic anhydride group is fully chemically bonded to the PATE. Those obtained simply by subjecting a PATE and a phthalic anhydride to a melt-extruding treatment fail to bring about the preferred effect. The phthalic anhydride group-containing PATE useful in the practice of this invention can however be produced by, for example, [I] a process wherein a dihalogen-substituted aromatic compound and an alkali metal sulfide are subjected to a polymerization reaction in a polar organic solvent containing water to produce a PATE, which comprises causing a monohalogen-substituted phthalic compound to exist in a polymerization reaction system, and controlling a ratio, a/b of the number of moles, a of the charged dihalogen-substituted aromatic compound to the number of moles, b of the charged alkali metal sulfide within a range of 0.8<a/b<1, or [II] a process comprising reacting an alkali metal sulfide and a PATE in a polar organic solvent containing water, whereby a compound (depolymerization product) having an alkali thiolate group on at least one terminal thereof is obtained owing to depolymerization to cut the principal chain of the PATE, and then reacting a monohalogen-substituted phthalic compound with the depolymerization product.

The process [I] is preferred in the case where the phthalic anhydride group-containing PATE is provided as a granular polymer having a high molecular weight.

As examples of the monohalogen-substituted phthalic compound, may be mentioned 4-halophthalic acids, 3-halophthalic acids and substituted phthalic derivatives with a halophenyl, halophenoxy, halophenylthio, halobenzenesulfonyl, halobenzenesulfinyl, halobenzyl, 2-halophenyl-2-propyl group or the like substituted on phthalic acid. The monohalogen-substituted phthalic compound may also be used in the form of a salt with an alkali metal or alkaline earth metal (a monometal phthalate or dimetal phthalate).

Halogen elements in these monohalogen-substituted phthalic compounds may be fluorine, chlorine, bromine or iodine. Among these monohalogen-substituted phthalic compounds, sodium hydrogen chlorophthalate, disodium chlorophthalate and chlorophthalic acid are particularly preferred.

In the case where the phthalic anhydride group-containing PATE is produced by the process [I], any ratios, a/b of the number of moles, a of the charged dihalogen-substituted aromatic compound to the number of moles, b of the charged alkali metal sulfide not greater than 0.8 make it difficult to provide any polymer having a high molecular weight. If a/b is not smaller than 1 on the other hand, it is difficult to introduce phthalic groups into the polymer. The monohalogen-substituted phthalic compound is generally used in a range of 0.05–30 mole %, preferably 0.1–25 mole % of the total amount of the dihalogen-substituted aromatic compound and the monohalogen-substituted phthalic compound. The total amount of the dihalogen-substituted aromatic compound and the monohalogen-substituted phthalic compound per mole of the alkali metal sulfide is generally in a range of 0.81–1.42 moles, preferably 0.83–1.40 moles.

No particular limitation is imposed on the amount of the polar organic solvent to be used. However, it is generally used in such a range that the number of moles (total moles) of the combined amount of the dihalogen-substituted aromatic compound and the monohalogen-substituted phthalic compound per kg of the polar organic solvent is 0.1–5 moles, preferably 0.5–3.5 moles.

The polymerization reaction is conducted in the polar organic solvent containing water. The water content is generally in a range of 0.5–30 moles, preferably 1–25 moles per kg of the polar organic solvent. A portion of this water may be added in the course of the polymerization reaction. When the alkali metal sulfide is used in the form of a hydrate, the water content may also be controlled by conducting a dehydration operation by azeotropic distillation or the like, as needed.

The monohalogen-substituted phthalic compound may be optionally added to the reaction system at any time. For example, there are processes wherein (1) the monohalogen-substituted phthalic compound is first of all charged together with the alkali metal sulfide in the reaction system, (2) the monohalogen-substituted phthalic compound is charged together with the dihalogen-substituted aromatic compound in the reaction system containing the alkali metal sulfide to start polymerizing, (3) the alkali metal sulfide and the dihalogen-substituted aromatic compound are first charged to start polymerizing, and the monohalogen-substituted phthalic compound is then added, and (4) these processes are combined with each other.

For example, in the case where the monohalogen-substituted phthalic compound is added to the reaction system in a state that it has been dissolved in water, a basic compound may also be added to the solution if desired. In order to keep the polymerization reaction system alkaline, the basic compound may be added to the polymerization reaction system to conduct the polymerization reaction. As such basic compounds, may be mentioned the hydroxides and oxides of alkali metals and alkaline earth metals, and mixtures of at least two compounds thereof.

The polymerization reaction is usually carried out at a temperature ranging generally from 150° to 300° C., preferably from 180° to 280° C. for generally 0.5–30 hours, preferably 1–20 hours in an inert gas atmosphere such as nitrogen or argon. The polymerization reaction may also be conducted by heating up the reaction mixture in two or more multi-steps. There is, for example, a process in which a preliminary polymerization is conducted at a temperature not higher than 235° C., and a final polymerization is carried out with the reaction mixture heated up to 240° C. or higher. In particular, according to a two-step watering polymerization process wherein when the reaction mixture is heated up to 240° C. or higher at the final stage in the two-step polymerization reaction, water is added before or after the heating (see U.S. Pat. No. 4,645,826; EP 166368), a polymer higher in molecular weight and far excellent in melt stability can be obtained with ease.

After completion of the polymerization reaction, a PATE containing phthalic groups is formed. If the phthalic groups exist in the form of a metal salt, the polymer is treated with acidic water to convert the groups in the form of an acid. When the polymer formed is dried after its washing, the phthalic groups undergo dehydration, thereby obtaining a PATE containing phthalic anhydride groups.

In the case where the phthalic anhydride group-containing PATE is produced by the process [II], for example, a PATE and an alkali metal sulfide are subjected to a depolymerization reaction at 200°–300° C. for 0.1–30 hours in a polar organic solvent containing water in a proportion of 0.1–20 moles per kg of the polar organic solvent, thereby preparing a depolymerization product having an alkali metal thiolate group on at least one terminal thereof, and a monohalogen-substituted phthalic compound is then reacted with the depolymerization product at a temperature of 200°–300° C., preferably 240°–280° C.

The amount of the phthalic anhydride groups contained in the phthalic anhydride group-containing PATE is generally at least 2%, preferably at least 3% in terms of an IR index (%) as determined by dividing an absorbance at 1850 cm$^{-1}$ which is the absorption band characteristic of phthalic anhydride group in an infrared absorption spectrum on the PATE by an absorbance at 1900 cm$^{-1}$ which is the out of-plane deformation overtone absorption band of CH and multiplying the resulting absorbance ratio by 100. If the IR index is lower than 2%, the effect of the phthalic anhydride groups introduced into the polymer becomes too little to exhibit better physical properties than the case making use of an unmodified PATE.

A similar infrared absorption is detected even on the modified polymer obtained simply by blending PATE and phthalic anhydride and then melt-extruding the blend. In this case, however, the phthalic anhydride groups are removed and no infrared absorption band characteristic thereof is detected when the modified polymer is subjected to a remelting treatment in N-methyl-2-pyrrolidone (hereinafter abbreviated as "NMP"), which will be described subsequently. In a word, sufficiently strong chemical bonding does not occur between the PATE and phthalic anhydride in this modification process.

On the other hand, the IR index of the phthalic anhydride group-containing poly(arylene thioether) used in this invention is preferably at least 2%, more preferably at least 3% even after the remelting treatment in NMP.

More specifically, the term "the remelting treatment in NMP" as used herein means the following treatment. In a 1-liter autoclave, is placed 50 g of a polymer sample together with 500 g of NMP, 30 g of water and 4 g of NaOH. After the autoclave being purged with nitrogen gas, the contents are heated with stirring to remelt (dissolve) the polymer. Thereafter, the contents are cooled at once with stirring and then sifted by a screen to separate the polymer. The polymer thus collected is washed with an aqueous NaOH solution and then an aqueous HCl solution, and then dried.

Polyamide

No particular limitation is imposed on the polyamide useful in the practice of this invention, and any known polyamides may be used. Specific examples thereof include aliphatic polyamides, aromatic polyamides, polyamide elastomers, amorphous polyamides, copolymerized polyamides, mixed polyamides, etc. As representative examples thereof, may be mentioned polycapramide (nylon 6), polyundecaneamide (nylon 11), polydodecaneamide (nylon 12), polyhexamethylene adipamide (nylon 66), polytetramethylene adipamide (nylon 46), nylon MXD6, copolymerized polyamides such as nylon 6/nylon 66, and mixed polyamides thereof.

Resin composition

The resin composition according to the present invention is a resin composition including a PATE component and a polyamide component, and uses the phthalic anhydride group-containing PATE as the whole or a part of the PATE component. The preferred compositional proportions of the resin composition according to this invention are as follows:

(A) PATE: 0–98.5 wt. %, preferably 0–89 wt. %, more preferably 0–72 wt. %;

(B) Phthalic anhydride group-containing PATE: 0.5–99 wt. %, preferably 1–90 wt. %, more preferably 3–80 wt. %; and (C) Polyamide: 99.5–1 wt. %, preferably 99–10 wt. %, more preferably 97–20 wt. %.

The phthalic anhydride group-containing PATE useful in the practice of this invention is excellent in compatibility with the polyamide. Therefore, when both polymers are blended with each other, the dispersibility of the resulting blend is remarkably improved compared with the case making use of an unmodified PATE. In the case where the phthalic anhydride group-containing PATE is used in combination with the unmodified PATE, it also serves as a compatibilizer between the PATE and the polyamide. The blending ratio of the PATE component (the unmodified PATE and phthalic anhydride group-containing PATE) to the polyamide may be suitably determined as necessary for the end application intended. When the phthalic anhydride group-containing PATE is used as a compatibilizer, an excellent effect is exhibited even in an extremely small amount.

The resin composition according to this invention may contain other components than the PATE component and polyamide so far as they do not impair the object of the present invention. Illustrative other components include fillers such as glass fibers and carbon fibers, resin improvers such as ethylene glycidyl methacrylate, elastomers, other thermoplastic resins, thermosetting resins, coupling agents, lubricants, stabilizers, nucleating agents, etc.

No particular limitation is imposed on the method of preparing the resin composition according to this invention. It is however preferable to use a method in which the PATE component and the polyamide are premixed in a Henschel mixer, tumbler or the like, a filler such as glass fibers is added thereto, if necessary, to mix further them, the resulting mixture is then melted and kneaded in an extruder and extruded into pellets.

ADVANTAGES OF THE INVENTION

According to the present invention, there is provided a resin composition including a PATE component and a polyamide, which can easily acquire good mechanical properties even under severe processing conditions.

EMBODIMENTS OF THE INVENTION

The present invention will hereinafter be described specifically by the following examples and comparative example. It should however be borne in mind that this invention is not limited to the following examples only.

Incidentally, the following methods were followed for the measurement of the physical properties of polymers in the following examples.

(1) IR index of the content of phthalic anhydride groups

With respect to a sheet obtained by hot-pressing each phthalic anhydride group-containing PATE sample at 320° C., and then putting the polymer sample thus hot-pressed into iced water to quench it, the infrared absorption spectrum according to the transmission method was measured by means of an "FT-IR 1760" manufactured by Perkin Elmer Company. From the spectrum thus obtained, an absorbance at 1850 cm$^{-1}$ which is the absorption band characteristic of phthalic anhydride group was divided by an absorbance at 1900 cm$^{-1}$ which is the out-of-plane deformation overtone absorption band of CH. The IR index was expressed in terms of a value (%) obtained by multiplying the resulting absorbance ratio by 100.

(2) Melt viscosity

The melt viscosity of each polymer sample was measured by a Capirograph (manufactured by Toyo Seiki Seisakusho, Ltd.) at a temperature of 310° C. and a shear rate of 1,200 sec$^{-1}$.

(3) Melting point (Tm) and glass transition temperature (Tg)

The melting point and glass transition temperature of a sheet obtained by hot-pressing each polymer sample at 320° C., and quenching the polymer sample thus hot-pressed were measured by a differential scanning calorimeter (DSC) manufactured by Perkin Elmer Company at a heating rate of 10° C./min in a nitrogen atmosphere.

(4) Thermogravimetric analysis

The thermogravimetric analysis on each polymer sample was conducted by a thermogravimetric analyzer (TGA) manufactured by Mettler Instrument AG at a heating rate of 20° C./min in a nitrogen atmosphere.

(5) Elongation at break

Each resin composition sample melted and kneaded was vacuum-dried for 8 hours at 100° C. and hot-pressed at 320° C., and then quenched, thereby forming a sheet having a thickness of about 200 μm. The sheet thus obtained was crystallized for 1 hour at 200° C. and then cut into strips 10 mm wide. The strip thus cut was used as a specimen to conduct a tensile test at a sample length of 20 mm, a cross-head speed of 4 mm/min and a temperature of 23° C., thereby determining an elongation at break.

(6) Observation of dispersion condition

The dispersion condition of the quenched sheet obtained in the item (5) was observed through a scanning electron microscope (SEM) after etching its polyamide component with hydrochloric acid. The dispersion condition was judged as coarse dispersion where the blend component of a dispersed phase contained a great number of particles having a particle diameter of at least 4 μm, and as fine dispersion where dispersed particles had a particle diameter smaller than 4 μm.

Referential Example 1
(Synthesis example of phthalic anhydride group-containing PATE)

A titanium-lined autoclave was charged with 3200 g of NMP and 1351.1 g (8.00 moles as S content) of hydrated sodium sulfide. After the autoclave being purged with nitrogen gas, 1373.8 g of an NMP solution, which contained 543.1 g (30.15 moles) of water, and 0.17 mole of hydrogen sulfide were distilled off while gradually heating the contents to 200° C.

Then, 1116.5 g (7.59 moles) of p-dichlorobenzene, 1540.2 g of NMP and 32.7 g of water were fed to react the contents at a temperature of 220° C. for 4.5 hours. Thereafter, 282 g (15.7 moles) of water, 175.9 g (0.790 mole) of sodium hydrogen 4-chlorophthalate and 31.32 g (0.783 mole) of sodium hydroxide were additionally introduced under pressure in the autoclave. The contents were heated up to 255° C. to react them for 5 hours.

After the resultant reaction mixture was sifted by a screen of 100 mesh to separate a granular polymer formed, the polymer thus collected was washed three times with acetone, four times with water and further five times with an aqueous HCl solution adjusted with HCl to pH 3, and then dewatered and dried (at 110° C. for 8 hours), thereby obtaining a granular polymer (Polymer A) with a yield of 73%. The physical properties of Polymer A thus obtained were as follows:

IR index of the phthalic anhydride group content: 28.4%;
Melt viscosity: 1340 poises;
Tm: 276° C.; and
Tg: 90° C.

Referential Example 2
(Synthesis example of phthalic anhydride group-containing PATE)

A titanium-lined autoclave was charged with 108 g of a poly(phenylene sulfide) (melt viscosity: 2800 poises) produced by Kureha Chemical Industry Co., Ltd., 500 g of NMP, 7 g of sodium hydroxide, 8.43 g (0.05 mole as S content) of hydrated sodium sulfide and 8.8 g of water. After the autoclave being purged with nitrogen gas, the contents were gradually heated up to 250° C. to react them for 30 minutes, thereby depolymerizing the poly(phenylene sulfide). Thereafter, the contents were cooled to room temperature. Then, 17.8 g (0.08 mole) of sodium hydrogen 4-chlorophthalate and 48.6 g of water were added to the autoclave, and the contents were heated up to 255° C. to react them for 2 hours.

A polymer formed was separated from the resultant reaction mixture and poured with stirring into an aqueous HCl solution adjusted to pH 1. The thus-immersed polymer was then washed with water, dewatered and dried to obtain a polymer (Polymer B). The physical properties of Polymer B thus obtained were as follows:

IR index of the phthalic anhydride group content: 215%;
Melt viscosity: not higher than 10 poises;
Tm: 284° C.; and
Tg: 82° C.

Referential Example 3
(Synthesis example of carboxyl group-containing PATE)

A titanium-lined autoclave was charged with 8000 g of NMP, 3360 g (19.99 moles as S content, water content: 53.6 wt. %) of hydrated sodium sulfide and 60 g (0.81 mole) of calcium hydroxide. After the autoclave being purged with nitrogen gas, 2400 g of an NMP solution, which contained 1260 g of water, and 0.50 mole of hydrogen sulfide were distilled off while gradually heating the contents to 200° C.

Then, 2646 g (18.00 moles) of p-dichlorobenzene, 384 g (2.01 moles) of 3,5-dichlorobenzoic acid and 3000 g of NMP were fed to react the contents for 5 hours at a temperature of 220° C. Thereafter, 1000 g (55.6 moles) of water was additionally introduced under pressure, and the contents were heated up to 255° C. to react them for 5 hours.

The resulting reaction mixture was sifted by a screen of 100 mesh to separate a granular polymer. The polymer thus collected was washed with acetone and then immersed for 2 hours with stirring in acidic water adjusted to pH 1. The thus-immersed polymer was then washed with water, dewatered and dried to obtain a polymer (Polymer C) as white granules with a yield of 50%.

In an infrared absorption spectrum on Polymer C, an absorption was observed at 1700 cm$^{-1}$. By ion chromatography, calcium was detected only by 60 ppm. From these results, it was confirmed that 3,5-dichlorobenzoic acid is copolymerized certainly and its carboxyl groups exist in an acid form. The physical properties of Polymer C were as follows:

Content of carboxylic acid component determined by oxygen analysis: 9.5 mole %;
Tm: 274° C.;
Tg: 83° C.; and.
Melt viscosity: 50 poises.

<Thermogravimetric analysis test>

Figure 1:
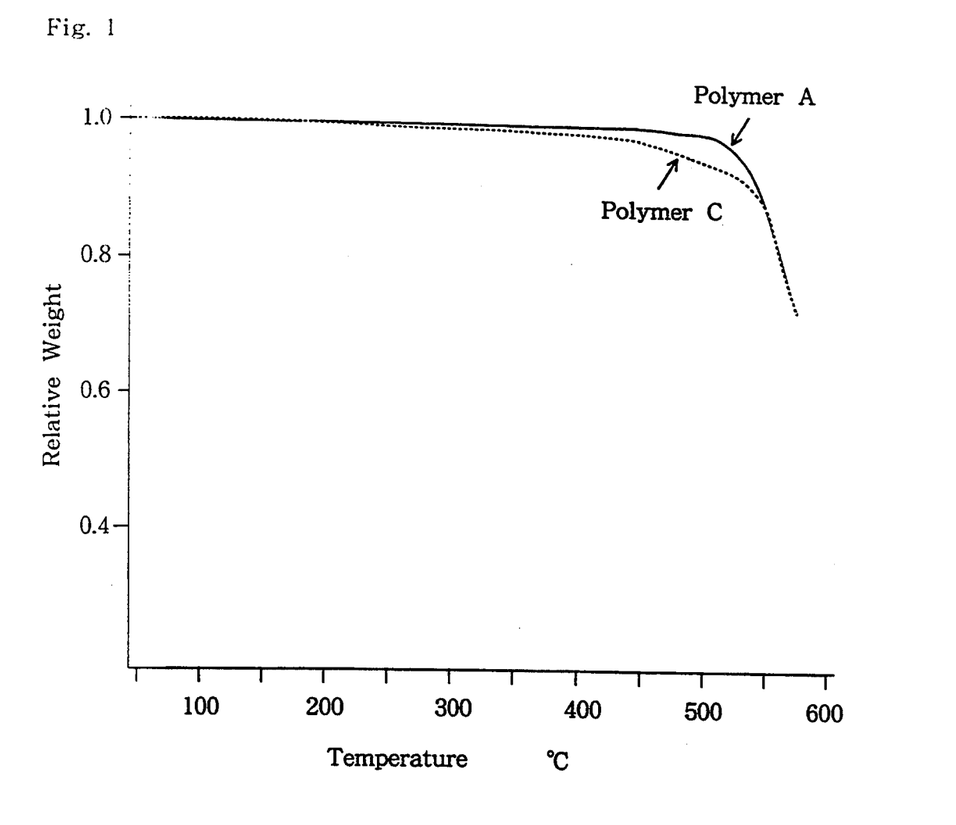
FIG. 1 is a chart illustrating the results of thermogravimetric analysis on a PATE (Polymer A) containing phthalic anhydride groups and a PATE (Polymer C) containing monocarboxyl groups.

The results of thermogravimetric analysis on Polymers A and C are shown in FIG. 1. With respect to the monocarboxyl group-containing PATE (Polymer C), weight loss on heating, which is considered to be caused by decarboxylation, is recognized from a relatively low temperature region. On the contrary, such weight loss on heating is not recognized on the phthalic anhydride group-containing PATE (Polymer A).

Figure 2:
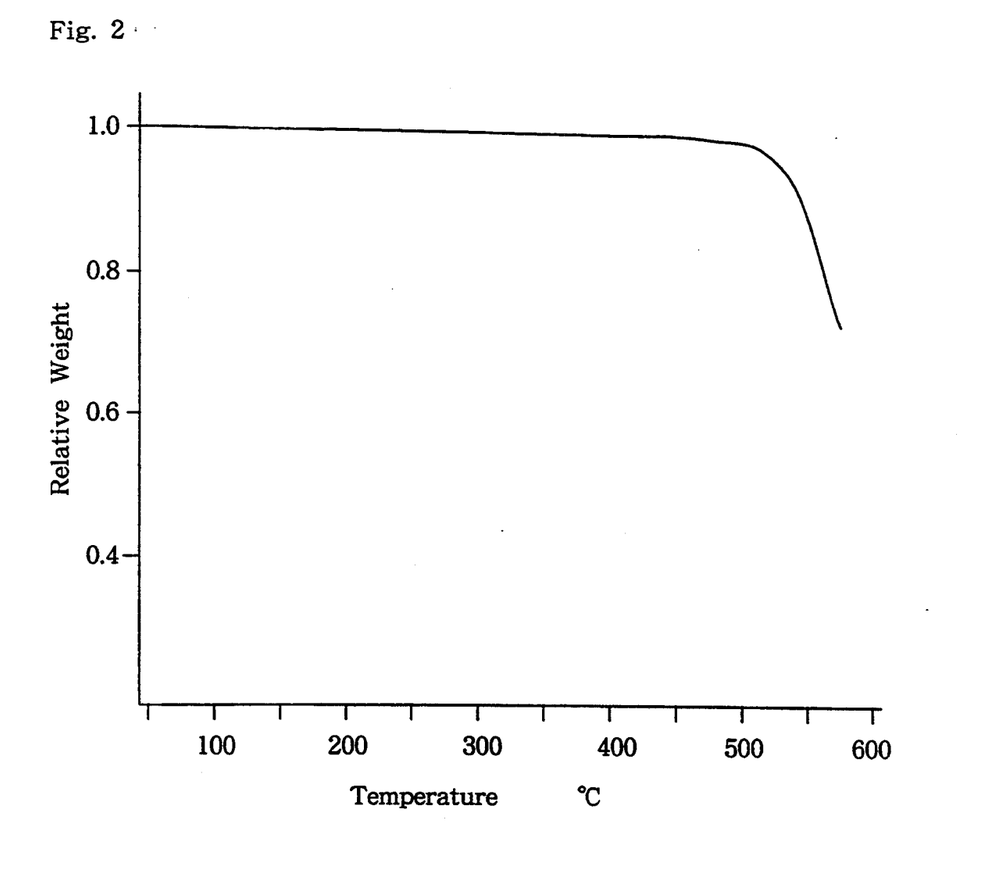
FIG. 2 is a chart illustrating the results of thermogravimetric analysis on a poly(phenylene sulfide).

The results of thermogravimetric analysis on a poly(phenylene sulfide) (product of Kureha Chemical Industry Co., Ltd.; melt viscosity: 1400 poises) (PPS-D) free of any functional group are also shown in FIG. 2. As apparent from a comparison between FIGS. 1 and 2, the results of the thermogravimetric analysis on the phthalic anhydride group-containing PATE (Polymer A) are substantially the same as those of the unmodified PATE. It is therefore understood that the heat stability of the phthalic anhydride groups is very good.

Accordingly, the resin composition of this invention does not lose its functional groups even under severe processing conditions, and hence acquires good mechanical properties. On the contrary, the monocarboxyl group-containing PATE (Polymer C) undergoes decarboxylation upon melt-kneading with the polyamide, and loses its functional groups. It is therefore considered that a compatibilizing effect to be expected is not developed.

Examples 1-8 and Comparative Examples 1-3

Their corresponding polymer components shown in Table 1 were separately intimately dry-blended and dried for about 8 hours by a vacuum dryer at 95° C. and a degree of vacuum of 1 mmHg or lower to fully remove water contained therein. Each of the blends thus obtained was then melted and kneaded for about 4 minutes at 300° C. in a laboratory blast mill mixer (manufactured by Toyo Seiki K.K.).

Each blend thus melted and kneaded was formed into a specimen. The elongation at break of the specimen was measured and its dispersion condition was observed. The results are shown in Table 1.

IR index of the phthalic anhydride group content: 16.0%
Melt viscosity: 1000 poises;
Tm: 277° C.; and
Tg: 89° C.

Referential Example 5

A PATE ("FORTRON KPSW214", product of Kureha Chemical Industry Co., Ltd.) (PPS-D) having a melt viscosity of about 1400 poises and phthalic anhydride were dry-blended with each other at a weight ratio of 98/2. The resulting blend was then extruded through a twin-screw extruder, "BT-30" at the maximum preset temperature of 310° C. to form pellets, thereby obtaining a melt-modified polymer a. The content of phthalic anhydride groups in the melt-modified polymer a was 119% in terms of the IR index.

Similarly, the same kind of PATE as that used above and sodium hydrogen 4-chlorophthalate were dry-blended with each other at a weight ratio of 98/2. The resulting blend was then extruded through the twin-screw extruder, "BT-30" at the maximum preset temperature of 310° C. to form pellets, thereby obtaining a

TABLE 1

| | Composition (wt. %) | | | | Elongation at break (%) | Dispersion condition |
|---|---|---|---|---|---|---|
| | PPS-D | Polymer A | Polymer B | Nylon 66 | | |
| Comparative Example 1 | 100 | 0 | 0 | 0 | 9.8 | — |
| Example 1 | 0 | 75 | 0 | 25 | 21.9 | Fine dispersion |
| Comparative Example 2 | 70 | 0 | 0 | 30 | 7.5 | Coarse dispersion |
| Example 2 | 0 | 70 | 0 | 30 | 19.5 | Fine dispersion |
| Example 3 | 17.5 | 52.5 | 0 | 30 | 20.5 | Fine dispersion |
| Example 4 | 35 | 35 | 0 | 30 | 23.1 | Fine dispersion |
| Example 5 | 52.5 | 17.5 | 0 | 30 | 22.6 | Fine dispersion |
| Example 6 | 0 | 65 | 0 | 35 | 35.6 | |
| Comparative Example 3 | 30 | 0 | 0 | 70 | 16.6 | |
| Example 7 | 0 | 30 | 0 | 70 | 51.0 | |
| Example 8 | 65.8 | 0 | 4.2 | 30 | 14.7 | Fine dispersion |

(1) PPS-D: Poly(phenylene sulfide) (product of Kureha Chemical Industry Co., Ltd.; melt viscosity: 1400 poises)
(2) Nylon 66: Polyamide (product of Hoechst Celanese Co., Ltd.)

Referential Example 4

A titanium-lined autoclave was charged with 3200 g of NMP, 1351.1 g (8.00 moles as S content) of hydrated sodium sulfide, 53.9 g (0.24 mole) of sodium hydrogen 4-chlorophthalate and 9.6 g (0.24 mole) of sodium hydroxide. After the autoclave being purged with nitrogen gas, 1373.8 g of an NMP solution, which contained 543.1 g (30.15 moles) of water, and 0.17 mole of hydrogen sulfide were distilled off while gradually heating the contents to 200° C.

Then, 1139.5 g (7.75 moles) of p-dichlorobenzene, 1540.2 g of NMP and 32.7 g of water were fed to react the contents at a temperature of 220° C. for 4.5 hours. Thereafter, 211 g (11.7 moles) of water was additionally introduced under pressure in the autoclave. The contents were heated up to 255° C. to react them for 5 hours.

Thereafter, an after-treatment was conducted in the same manner as in Referential Example 1, thereby obtaining a granular polymer (Polymer E) with a yield of 78%. The conversion of p-dichlorobenzene was 91% upon completion of the preliminary polymerization. The physical properties of Polymer E thus obtained were as follows:

melt-modified polymer b. The content of phthalic anhydride groups in the melt-modified polymer b was 29% in terms of the IR index.

The melt-modified polymers a and b, and Polymer E produced in Referential Example 4 were subjected to a remelting treatment in NMP and subsequent determination of the amount of functional groups by IR analysis. More specifically, the individual polymer samples in amounts of 50 g were separately placed in a 1-liter autoclave. To each autoclave, 500 g of NMP, 30 g of water and 4 g of NaOH were added. After the autoclave being purged with nitrogen gas, the contents were heated from room temperature to 255° C. for about 1 hour to melt the polymer. The heating was stopped at once at the time the temperature of the contents reached 255° C. to cool the contents to 80° C. for about 1.5 hours while stirring them. After cooling the contents, a slurry taken out of the autoclave was sifted by a screen of 100 mesh to separate the polymer. The polymer was then washed three times with an aqueous NaOH solution (pH: 12.5) to remove phthalic acid extracted by the remelting treatment in NMP and twice with an aqueous HCl solution (pH: 2) to convert salts in the form of an acid. The thus-treated polymer was dried and then formed into a sheet by hot-pressing at 320° C. and quenching. An infrared absorption spectrum of the thus-formed sheet was measured to determine the content of phthalic anhydride groups.

The IR indices of the melt-modified polymers a and b were both 0%. On the contrary, the IR index of Polymer E was 12%. Namely, both modified polymers obtained by respectively blending PATE and phthalic anhydride, and PATE and sodium hydrogen 4-chlorophthalate and then melt-extruding the blends contained the phthalic anhydride groups. However, no infrared absorption band characteristic of phthalic anhydride was detected after they were subjected to the remelt-extracting treatment in NMP. The IR spectra on these polymers were the same as that of the unmodified PATE. With respect to Polymer E on the other hand, it was clearly recognized that the phthalic anhydride groups are present even after the remelting treatment in NMP. It is therefore understood that Polymer E is favorably different in bonding strength to phthalic group from the modified polymers obtained by the mere mixing and melt-extruding process.

Examples 9-14 and Comparative Examples 4-7

Their corresponding polymer components shown in Table 2 were separately intimately dry-blended and vacuum-dried for 10 hours at 105° C. Each of the resulting blends was then extruded through a twin-screw extruder, "BT-30" at the maximum preset temperature of 285° C. to form pellets. Each pellet sample thus obtained was vacuum-dried for 10 hours at 105° C. and then molded by a 75T injection molding machine at a mold temperature of 145° C. to produce specimens for tensile test and Izod impact test. The compositions of the samples mixed and the evaluation results of mechanical properties as to the specimens thus produced are shown in Table 2. Incidentally, the tensile test was conducted at a stress rate of 5 mm/min in accordance with ASTM-D 638. The Izod impact test followed ASTM-D 256.

ment in N-methyl-2-pyrrolidone is determined in accordance with the following method:

With respect to a sheet obtained by placing 50 g of a polymer sample in a 1-liter autoclave, adding 500 g of N-methyl-2-pyrrolidone, 30 g of water and 4 g of NaOH thereto, purging the autoclave with nitrogen gas, heating the contents to melt the polymer, cooling the contents at once with stirring, taking a slurry out of the autoclave after cooling the contents, sifting the slurry by a screen of 100 mesh to separate the polymer thus treated, washing the polymer collected three times with an aqueous NaOH solution (pH: 12.5) and twice with an aqueous HCl solution (pH: 2) to convert salts in the form of an acid, drying the thus-treated polymer, hot-pressing the polymer at 320° C. and then pouring the polymer hot-pressed into an iced water to quench it, the infrared absorption spectrum is measured to determine the IR index (%) from the thus-obtained spectrum by dividing an absorbance at 1850 $cm^{-1}$ which is the absorption band characteristic of phthalic anhydride group by an absorbance at 1900 $cm^{-1}$ which is the out-of-plane deformation overtone absorption band of CH and multiplying the resulting absorbance ratio by 100.

2. The resin composition as claimed in claim 1, comprising 0-98.5 wt. % of the poly(arylene thioether), 0.5-99 wt. % of the poly(arylene thioether) comprising phthalic anhydride groups and 99.5-1 wt. % of the polyamide.

3. The resin composition as claimed in claim 1, wherein the poly(arylene thioether) comprising phthalic anhydride groups is obtained by a process comprising reacting a dihalogen-substituted aromatic compound, an alkali metal sulfide and a monohalogen-substituted phthalic acid compound in a polar organic solvent containing water to produce a poly(arylene thioether), and controlling a ratio, a/b of the number of moles, a, of the charged dihalogen-substituted aromatic compound to the number of moles, b, of the charged alkali metal sulfide within a range of 0.8<a/b <1.

4. The resin composition as claimed in claim 1, wherein the poly(arylene thioether) comprising phthalic anhydride groups is obtained by a process comprising reacting an alkali metal sulfide and a poly(arylene thioether) in a polar organic solvent containing water, whereby a depolymerization product having an

TABLE 2

| | Composition (wt. %) | | | | | Tensile strength (kgf/mm²) | Izod impact strength (kgfcm/cm) | |
|---|---|---|---|---|---|---|---|---|
| | Polymer E | PPS-D | Polymer a | Polymer b | Nylon 66 | | V-Notched | Reverse notched |
| Example 9 | 30 | 0 | 0 | 0 | 70 | 9.0 | 5.0 | 106 |
| Example 10 | 55 | 0 | 0 | 0 | 45 | 9.5 | 3.8 | 113 |
| Example 11 | 70 | 0 | 0 | 0 | 30 | 9.3 | 2.9 | 66 |
| Example 12 | 52.5 | 17.5 | 0 | 0 | 30 | 9.6 | 2.8 | 94 |
| Example 13 | 35 | 35 | 0 | 0 | 30 | 9.3 | 2.9 | 72 |
| Example 14 | 17.5 | 52.5 | 0 | 0 | 30 | 8.9 | 2.9 | 66 |
| Comparative Example 4 | 0 | 0 | 70 | 0 | 30 | 4.6 | 1.5 | 12 |
| Comparative Example 5 | 0 | 0 | 0 | 70 | 30 | 5.3 | 2.8 | 22 |
| Comparative Example 6 | 0 | 30 | 0 | 0 | 70 | 7.4 | 4.8 | 66 |
| Comparative Example 7 | 0 | 70 | 0 | 0 | 30 | 7.6 | 2.7 | 28 |

(1) PPS-D: Poly(phenylene sulfide) (product of Kureha Chemical Industry Co., Ltd.; melt viscosity: 1400 poises).
(2) Nylon 66: Polyamide (product of Hoechst Celanese Co., Ltd.).
(3) Tensile test was conducted in an absolute dry condition.
(4) Izod impact test was conducted after regulating the temperature and humidity to 23° C. and 50%, respectively.

What is claimed is:

1. A resin composition comprising a poly(arylene thioether) and a polyamide at least part of said poly(arylene thioether) consisting of a poly(arylene thioether) comprising phthalic anhydride groups, wherein the poly(arylene thioether) comprising phthalic anhydride has an infrared (IR) index at least 2% after subjecting the same to a remelting treatment in N-methyl-2-pyrrolidone, wherein the IR index after the remelting treatalkali thiolate group on at least one terminal thereof is obtained, and then reacting a monohalogen-substituted phthalic compound with the depolymerization product.

5. A resin composition comprising a poly(arylene thio ether) and a polyamide at least part of said poly(arylene thio ether) consisting of a poly(arylene thio ether) comprising phthalic anhydride groups fully chemically bonded to the poly(arylene thio ether).

* * * * *